March 28, 1939.   A. HENDERSON   2,152,190

COMPOSITE BLOCK

Filed May 28, 1936

INVENTOR
Albert Henderson
by his attorneys
Stebbins, Blenko & Parmelee

Patented Mar. 28, 1939

2,152,190

UNITED STATES PATENT OFFICE 2,152,190

COMPOSITE BLOCK

Albert Henderson, Pittsburgh, Pa., assignor to William P. Witherow, Pittsburgh, Pa.

Application May 28, 1936, Serial No. 82,227

1 Claim. (Cl. 72—37)

This invention relates to a building element and, in particular, to a block having a light weight cellular body and a dense strong outer layer enclosing said body.

Expanded cement blocks have considerable utility in the construction of non-load bearing partitions, because of the high insulating value of such material against heat and sound. It has also been proposed to make expanded cement blocks strong enough for use in load bearing walls by adding sand to the expanding mix. This increases the weight of the block and reduces its insulating value.

I have invented a novel building block and a method whereby it may be manufactured, such that expanded cement blocks may be made strong enough to be used in load bearing walls without sacrificing their insulating properties. In accordance with my invention, I first form a block of expanded cement. I then place the expanded cement block in a mold somewhat larger than the block, having first placed in the mold a layer of concrete. I then pour concrete around and over the expanded cement block to completely encase it. The resulting block has a strength sufficient to permit its use in load bearing walls. Because of the porous character of the expanded cement block forming the body of the finished article, the concrete forming the surface layer partly penetrates the body and forms an intimate bond therewith.

A present preferred embodiment of the block and a method for its manufacture are illustrated in the accompanying drawing in which Fig. 1 is a sectional view through a mold showing an expanded cement block therein ready for the casting of the surface layer;

Figure 1:
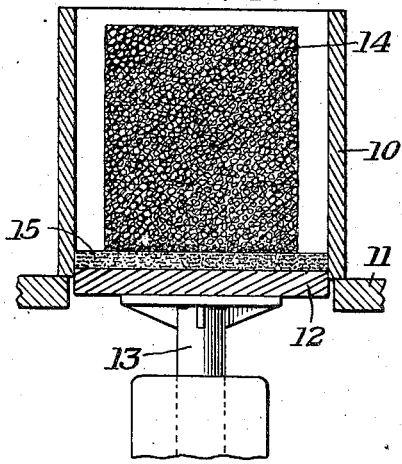

Referring now in detail to the drawing, I provide an open bottomed mold 10 adapted to rest on any suitable support 11. A mold bottom or pallet 12 is reciprocable vertically of the mold by means of a pneumatic jack 13 or other equivalent means.

In carrying out the method of my invention, I first mold an expanded cement block 14. With the mold parts in the positions shown in Fig. 1 I then pour a layer of concrete 15 in the mold. The block 14, having been properly cured, is then placed in the mold, as shown in Fig. 1, and additional concrete poured around and over the block. The block 14 is porous in character, and the concrete mix 15 is sufficiently liquid to penetrate the block to a substantial depth, e. g., ½" and form an intimate bond therewith.

Figure 2:
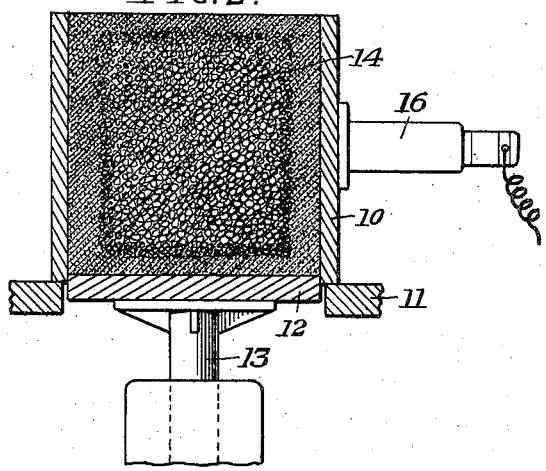
Fig. 2 is a similar view showing the block after the casting of the surface layer.

Fig. 2 illustrates the nature of the surface layer and the interlocking bond between it and the body of the block. An electric vibrator 16 may be applied to the mold to ensure proper filling thereof and thorough bonding between the body and the surface layer.

After the surface layer has acquired an initial set, the jack 13 may be operated to eject the complete block from the mold 10 for curing the surface layer. This gives the sides of the block a troweled surface. When the surface layer has been properly cured and aged, the block is ready for use.

The dimensions of the expanded cement body 14 may be chosen with regard to the particular application for which the blocks are to be used. The thickness of the surface layer is also subject to variation depending upon the load bearing strength desired. The surface layer may be of different thicknesses on different sides of the block. The blocks shown in Figs. 2 and 3, for example, have relatively thick surface layers on their sides and thinner layers on their tops and bottoms.

Figure 3:
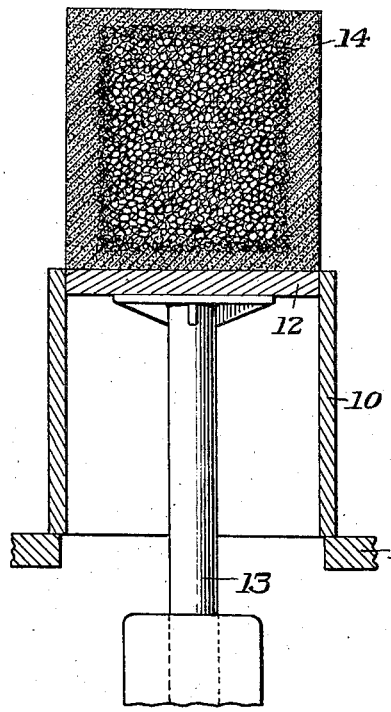
Fig. 3 is a similar view showing the finished block ejected from the mold for curing.

Figs. 2 and 3 also illustrate the character of the bond between the body of the block and the surface layer. There is no definite plane of cleavage between the parts. The boundary is irregular and there is an actual penetration of the cells of the body by the concrete of the surface layer, and mechanical interlocking therebetween.

Figure 4:
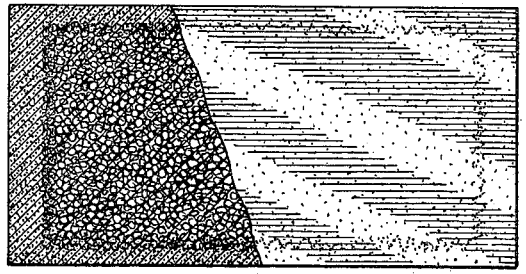
Fig. 4 is a view partly in section and partly in plan showing a special form of block.

The shape of the blocks is capable of wide variation. Fig. 4 is a view partly in plan showing a block having a length several times its depth. The blocks of Figs. 2 and 3 have a depth substantially equal to their width and may be of any desired length.

Figure 5:
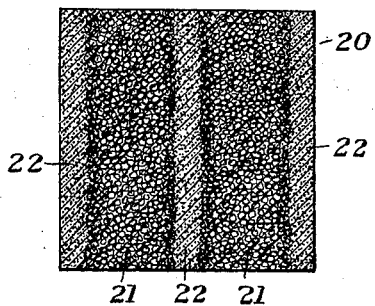
Fig. 5 is a transverse section through a further form of block.

Fig. 5 illustrates a block 20 having expanded cement layers 21 sandwiched between concrete layers 22. This block is made by disposing the layers 21 on end in a core such as that shown in 10, and pouring a concrete mix around and between them. As indicated in Fig. 5, the surface layers may be applied to less than all of the exposed surfaces of the block. In Fig. 1, for example, the concrete layer 15 may be omitted if it is desired to apply the surface layer to the sides of the block. In that case, also, the mold would be filled with the concrete mix only to the level of the top of the expanded cement block.

As a specific example of the composite block of my invention, an expanded cement block 8" x 8" x 16" having a ½" surface layer applied thereto in the manner above described would have a total compression strength of 91,300 pounds, representing 23 sq. in. of the concrete layer at 2600 pounds per square inch and 105 sq. in. of the expanded cement at 300 pounds per square inch. Most municipal building codes permit masonry designs to be based on a strength of 700 pounds per square inch. For the size of block mentioned, this figures 89,600 pounds total strength. My composite block thus has an average strength greater than 700 pounds per square inch. At the same time, my block is relatively light in weight and has good insulating qualities.

The completely encased blocks, when laid up in a wall, are weatherproof and are not subject to breakage as a result of frost or rain seepage followed by freezing. The top and bottom surface layers also provide strength against lateral shear in the expanded cement body so that the composite block, under load, will not split vertically.

I am aware that it has been suggested previously to pour expanding cement between preformed surface layers of material such as gypsum (Payne Patent No. 1,709,035) for the purpose of protecting the expanded cement body against breakage during handling and shipment. My invention differs from that practice in that I pour a mix of cement and sand around a porous block previously formed and cured. I thus obtain a block having strength enough for load bearing walls. The block also is weatherproof and the bond between the body and surface is very strong being much superior to the bond between concrete and gypsum.

By pouring a surface layer around a previously formed porous block, I avoid the difficulty experienced with the previous method resulting from the fact that expanded cement shrinks. This shrinkage tends to break the bond between the surface layer and the body. Since I use only a cured expanded cement block, this difficulty is entirely overcome as there is no shrinkage after curing. The surface layer which I provide has relatively slight shrinkage. Another advantage of my invention is that the materials of which the body and surface layers of the composite block are composed, being both largely of cement, have similar coefficients of expansion. The advantage of my block over the expanded cement block incorporating sand is that the former is weatherproof while the latter is not. By retaining a density of about 36 pounds per cubic foot in the expanded cement body of my composite cement block, I preserve the high insulating quality thereof.

While I have illustrated and described but one preferred practice of my method and a few embodiments of the article manufactured thereby, it will be recognized that changes in the method and the article may be made without departing from the spirit of the invention or the scope of the appended claim.

I claim:

A load-bearing insulating block having a cellular core of expanded material composed at least in part of Portland cement having cellular outer surfaces and forming an insulating medium, and a dense non-cellular veneer also composed at least in part of Portland cement forming a load-bearing medium, said veneer being bonded to the outer surfaces of the core and interlocked with the outer cells of the core, whereby an intimate bond is formed between the core and the veneer.

ALBERT HENDERSON.